Nov. 8, 1932.                J. H. WAGENHORST                1,886,611
                                  RIM TOOL
                            Filed Aug. 8, 1928           2 Sheets-Sheet 1

INVENTOR.
James H. Wagenhorst
BY Church & Church
His ATTORNEYS

Nov. 8, 1932. J. H. WAGENHORST 1,886,611
RIM TOOL
Filed Aug. 8, 1928 2 Sheets-Sheet 2
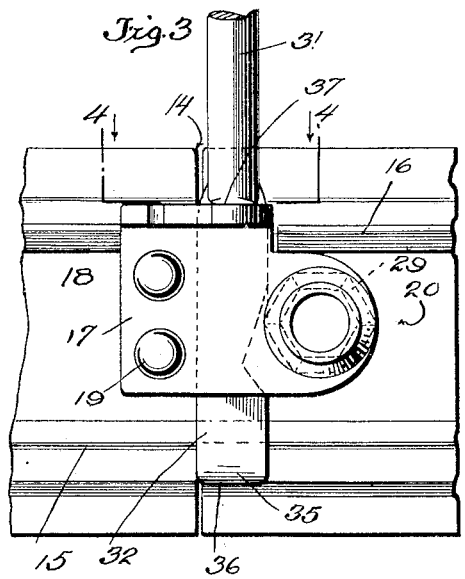
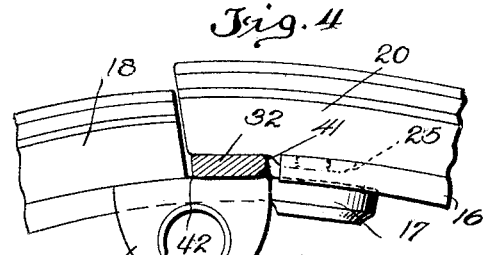
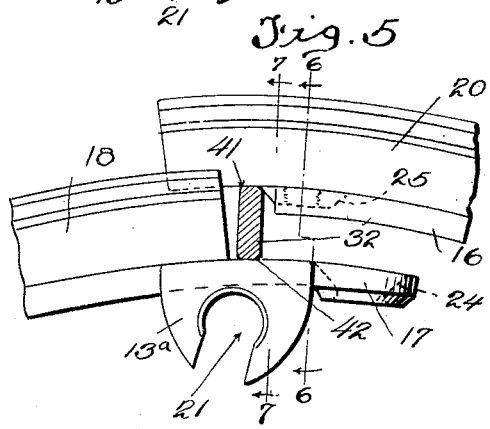
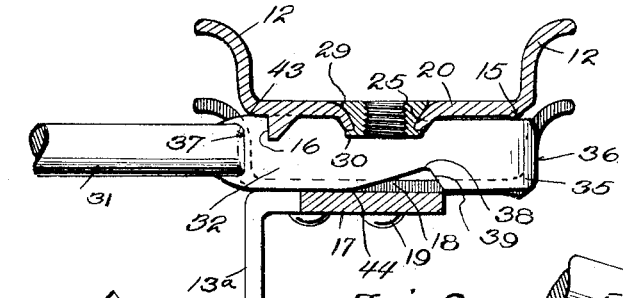
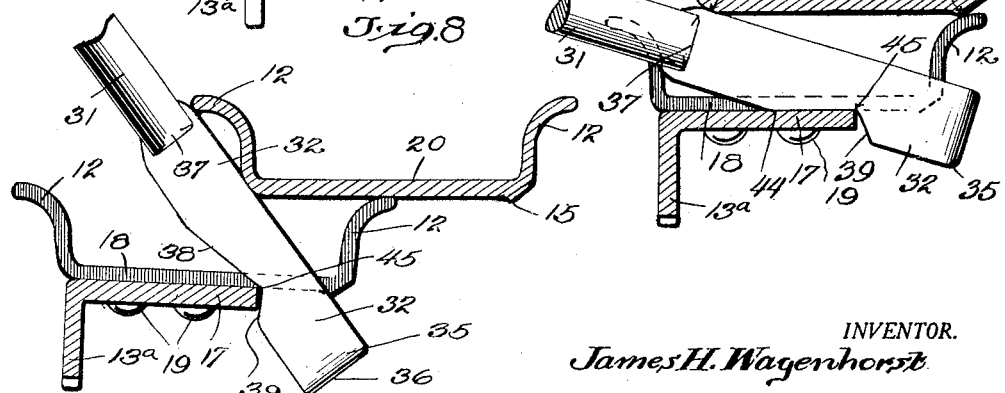
INVENTOR.
James H. Wagenhorst
BY Church & Church
His ATTORNEYS Patented Nov. 8, 1932

1,886,611

UNITED STATES PATENT OFFICE

JAMES H. WAGENHORST, OF JACKSON, MICHIGAN

RIM TOOL

Application filed August 8, 1928. Serial No. 298,340.

This invention relates to rim tools and particularly to detachable tools for operating the rim to facilitate replacement of a tire thereon.

It is necessary, in the use of transplit tire-carrying rims, to provide some means for locking the ends of the rim together at the split to prevent accidental separation, and it is common practice to provide a locking plate permanently and rigidly secured to the under surface of one rim end and extending across the split with its free end detachably secured to the other rim end. The present trend of tire design is toward tires of smaller diameter and greater cross section, necessitating rims of smaller diameter having a wider base and higher flanges, and made of heavier stock. These factors all tend to stiffen the rim and render the collapsing of the rim for the removal or replacement of a tire extremely difficult.

One of the objects of the invention is to provide simple and efficient means for quickly and easily moving the rim ends relative to each other to permit ready removal or replacement of a tire, and embodies a particular form of locking plate and rim structure and an operating tool for co-operating with such plate and rim structure to move one rim end radially inwardly, then circumferentially to underlie the other rim end, and then laterally relatively to the other rim end. A further object of the invention is to provide such a rim structure and operating tool which will co-operate to prevent the rim being "sprung" or so distorted as to acquire a permanent set which would render it difficult to restore it to its proper shape. Further objects of the invention are to provide rim and tool structures for the purpose described which may be economically manufactured and to provide simple, efficient and durable means for aligning the rim ends and for securing them together. Still further objects of the invention and the novel features of construction and operation of the parts will be apparent from the following description of one embodiment of the invention as illustrated in the accompanying drawings, in which:

Fig. 3 is a fragmentary plan view of the inner side of the structure shown in Figs. 1 and 2, the tool being shown as positioned to effect the first stage of the separation of the rim ends;

Fig. 4 is a fragmentary view in elevation of the parts as shown in Fig. 3, the tool being shown in section on the line 4—4 of Fig. 3;

Fig. 5 is a view similar to Fig. 4, but showing the position of the parts after the tool has been rotated to effect the second stage of the separation of the rim ends;

Fig. 6 is a view in transverse section on line 6—6 of Fig. 5;

Fig. 7 is a view in transverse section on line 7—7 of Fig. 5, but showing the position of the parts after the end of tool has been swung down to effect the third stage of the separation of the rim ends; and, Fig. 8 is a view in transverse section on line 7—7 of Fig. 5, but showing the position of the parts after the tool has been moved to effect the fourth stage of the separation of the rim ends.

Figure 1:
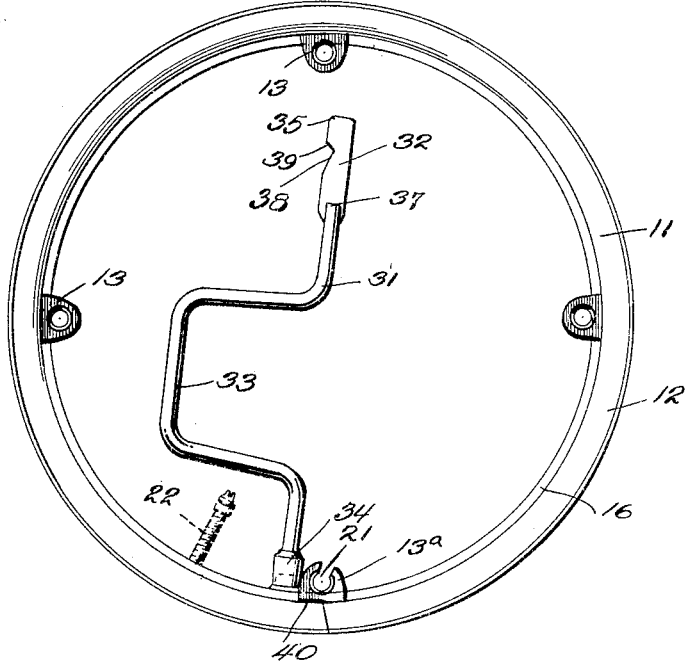
Fig. 1 is a view in elevation of a rim and tool embodying the invention, the tool being shown in the position in which it is used to operate the rim end securing means.

As shown in the drawings the invention is embodied in a rim 11 having flanges 12 for a straight side tire and having attached lugs 13 by which the rim may be detachably secured to a wheel structure. The rim 11 is transplit at 14 on a plane which intersects the base of the rim on a line perpendicular to the edges thereof but intersects the flanges on a line forming a slight angle with the radius. As shown in Fig. 6 the base of the rim 11 is formed with a slight circumferential bead 15 adjacent its rear inner edge and a heavier circumferential rib 16 adjacent its front inner edge, this being a well known type of rim, but it will be understood that the invention is in no way limited to any particular type of rim and is capable of adaptation to any transplit type.

A latch plate 17 is secured to one rim end 18 by rivets 19, or similar suitable means, its free end underlying and being detachably secured to the other rim end 20, as will be presently described, and an attaching lug 13a is formed integral with the latch plate 17 and extends radially inwardly in the plane of the attaching lugs 13. The rib 16 of the rim is cut away to receive the laterally projecting portion of the latch plate and the lug 13a is provided with a slot 21, extending substantially parallel to the direction in which the valve stem 22 will extend when passed through the valve stem hole 23, to facilitate the mounting of the assembled rim and tire upon the wheel body.

Figure 2:
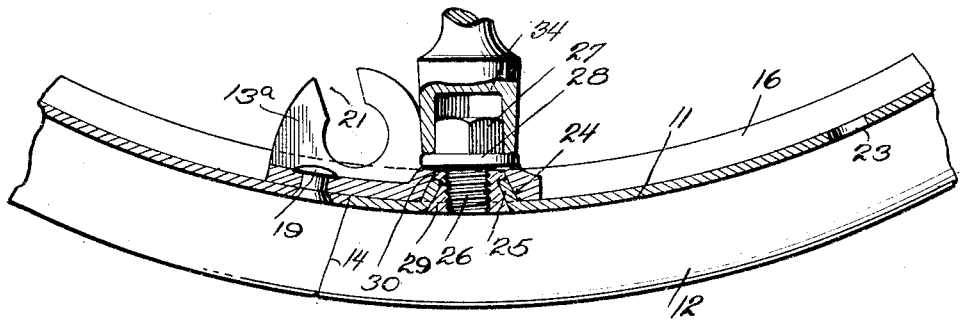
Fig. 2 is an enlarged view in section taken on the center line of the rim.

The free end of the latch plate 17 is formed with a frustro-conical recess 24 to receive and snugly fit upon a similar projection 25, extending from the under face of the rim end 20, as best shown in Fig. 2, and a screw 26, preferably having an hexagonal head 27 and a collar 28, is threaded into the projection 25, it being apparent that, by reason of the conical formation of the parts, the tightening of the screw to secure the rim ends together will force such rim ends into their true alignment, both laterally and circumferentially. The interiorly threaded projection 25 is preferably formed by punching an opening in the rim and forcing the metal about the opening inwardly, a tapering nut 29 of polygonal cross-section being then forced into the opening and its inner edge riveted over at 30, so that it will be rigidly secured in place and its non-circular cross section will prevent its rotation.

A tool 31, having a flat blade-like end portion 32, is provided for the separation of the rim ends, and since in use it must be both rotated and used as a lever, it is preferably formed with a U-crank 33, offset laterally from the body of the tool. The other end of the tool may be formed with a socket wrench 34 to fit the hexagonal head of the screw 27, but it will be understood that this particular form of crank and the embodiment of a screw-operating wrench in the same tool are not essential to the present invention. The width of the tool blade 32 is considerably greater than its thickness and at the end of the blade the flat sides are inclined toward each other at 35 to form a tapered wedge end 36 of substantially the full width of the blade. An abutment 37 is provided on the blade portion 32 at a point spaced from the wedge end by a distance approximately equal to the width of the base of the rim, and, as shown, may be conveniently formed by making the body of the tool of round stock and utilizing the end of the circular formation as the abutment. A notch 38 is formed in one side edge of the blade portion 32, the outer side 39 of the notch adjacent the wedge end 35 being flat and inclined to act as a cam as will be presently described.

The separation of the rim ends is accomplished in four stages, after the screw 26 has been removed by the socket wrench 34, or other suitable wrench, the various stages being represented in Figs. 3, 6, 7 and 8, respectively. The first step is to engage the wedge end 35 of the tool between the lower surface of the rim end 20 and the latch plate 17, and sliding the tool lengthwise until the abutment 37 engages the side of the rim flange and the latch plate. The insertion of the wedge end of the tool is facilitated by the slight curving of the corner of the rim and latch plate, but if desired the plate may be slightly deformed, as indicated at 40 in Fig. 1, to further facilitate the operation. The wedging action effected by the entry of the blade 32 will move the rim end 18 radially inwardly by the thickness of the blade and a slight circumferential movement may occur if the contracting tension on the rim is sufficient, as shown in Fig. 4.

The second step is the rotation of the tool by the crank arm 33 which will swing the rim end 18 radially and circumferentially, the end of the rim moving in a curved path which is substantially the arc of a circle having a radius equal to the width of the blade 32. As the movement begins, the corners 41 and 42 of the blade portion 32 will be in engagement with the rim end 20 and the latch plate, respectively, but a slight slipping will occur by reason of the engagement of the blade with the projection 25 and the rim end 18. The spring of the metal of the rim tending to restore the rim ends to aligned position will effect sufficient friction on the blade 22 to overcome any tendency of the rim ends to slip circumferentially on the tool, and the rotation of the tool will move the rim ends relatively to each other to the offset overlapping relation shown in Figs. 5 and 6, the rim being thus contracted circumferentially. The stability of the parts in this position is somewhat dependent upon the relative proportions of the blade 32.

The next step is to swing the blade 32 of the tool inwardly to the position shown in Fig. 7, the tool being fulcrumed at the point 43 where it engages the rim end 20 and engaging at the point 44 with the latch plate 17, so that the rim ends will be pried still further apart by reason of the effective lever arm between the points 43 and 44, and at the same time the latch plate, and hence the rim end 18, will be cammed laterally by the engagement of the cam surface 39 with the upper corner of the latch plate. It is preferable that the parts be so proportioned that, as shown in Fig. 7, the top of the flange 12 of the rim end 18 will engage the bead 15 or the under surface of the rim end 20, so that the parts will be in stable relation.

The final step is effected by further swing-